FIG. 1.

Aug. 10, 1965 N. C. L. BROWN 3,200,245
AUTOMATIC CAR RETARDER CONTROL SYSTEM
Filed Sept. 17, 1958 9 Sheets-Sheet 3

INVENTOR.
N. C. L. BROWN
BY
Forest B. Hitchcock
HIS ATTORNEY

Aug. 10, 1965 N. C. L. BROWN 3,200,245
AUTOMATIC CAR RETARDER CONTROL SYSTEM
Filed Sept. 17, 1958 9 Sheets-Sheet 7

INVENTOR.
N.C.L. BROWN
BY
*Forest B. Hitchcock*
HIS ATTORNEY

Aug. 10, 1965  N. C. L. BROWN  3,200,245
AUTOMATIC CAR RETARDER CONTROL SYSTEM
Filed Sept. 17, 1958  9 Sheets-Sheet 8

INVENTOR.
N. C. L. BROWN
BY
*Forest B. Hitchcock*
HIS ATTORNEY

United States Patent Office 3,200,245
Patented Aug. 10, 1965

3,200,245
AUTOMATIC CAR RETARDER CONTROL SYSTEM
Ned C. L. Brown, Scottsville, N.Y., assignor to General Signal Corporation, a corporation of New York
Filed Sept. 17, 1958, Ser. No. 761,533
10 Claims. (Cl. 246—182)

This invention relates to automatic retarder control systems for railroads, and it more particularly pertains to the automatic control independently of a plurality of car retarder operating units provided for respective car retarder sections.

A car retarder as contemplated by the present invention is of the track brake type for use in the trackway at any point where it is considered desirable to reduce the speed of a free rolling railway car, either to cause the car to leave the retarder at a predetermined speed, or under other conditions to hold the car in the retarder. Such retarders are generally used in a hump classification yard as a means for causing all cars being classified to reach their destinations in the respective classification tracks at desired coupling speeds. The retarders may also be used at the ends of the classification tracks to stop and hold the first cars entering these tracks.

The car retarder provided by the present invention is of the weight-automatic type and provides improvements over the car retarder disclosed in my copending U.S. patent application Ser. No. 534,750, filed September 16, 1955, now Patent No. 2,858,907. These improvements comprise better bearing supports, including self-aligning bearings, the addition of thrust bearing structure, improved adjustment features, and improved spring suspension of the dead weight of the retarder.

The retarder provided by the present invention comprises a succession of substantially independent retarder units adjoining end to end, each unit comprising, in associating with each rail, a pair of shoe beams and a substantially independent operating mechanism, one of these operating mechansims being associated with each point where ends of shoe beams are adjoining. Each of the operating mechanisms can be operated independent of any other operating mechanism of the retarder to a selected open or closed position, the respective operating mechanisms being automatically controlled in accordance with the amount of retardation required.

As means for automatically controlling the respective operating units in accordance with the amount of retardation required for each car, the desired exit speed at which the car should leave the retarder is first computed in accordance with the performance of a car in approching the retarder. A rough adjusting of the retarder is then made by determining whether all sections of the retarder are required, and if not, a selected number of operating units at the entrance end of the retarder are opened before the car enters. Timers are then set for timing sections associated with control of several of the other operating units. These timers are initiated successively upon the passage of a car, and upon completion of their timing, the associated operating mechanisms are actuated to open their associated shoe beams at just the proper times to cause each car to leave the last operating unit of the retarder at the computed exit speed for that car.

The timers are initiated by short track sections of lengths comparable to the lengths of the shoe beams, and these timing sections are provided for the retarder units for a substantial portion of the retarder including the leaving end. By this organization, a new timer is initiated each time the front axle of a front or rear car truck enters a track section.

Accuracy in timing is accomplished by having each timing section include several successive track sections so that the time intervals being measured are relatively long. Thus, inasmuch as a timer is initiated each time the first axle of a truck enters a track section, the timers are overlapping in their operations, and several timers for different operating mechanisms may be active at the same time. The timing sections, however, are of such a length as to permit the timers to be restored to normal between the trucks of each car so that the timers are actuated independently by the front and rear trucks of each car. The timers control their associated operating mechanisms independently in a manner to maintain the associated retarder units closed except when the timer has completed its operation. At this time the associated retarder unit is opened and is maintained open as long as the associated timing section is occupied by either axle of the truck being timed.

An object of the present invention is to control each of a pluarality of successive retarder operating units independently in accordance with the amount of retardation required for each car.

Another object of the present invention is to selectively govern as to how many successive retarder units adjoining the entering end of the retarder are to be closed for each car in accordance with the performance of the car in approaching the retarder.

Another object of the present invention is to provide independent timer control for each of several retarder units extending through a substantial portion of a retarder adjoining the exit end.

Another object of the present invention is to set the timers for the successive operating mechanism to different values selected in accordance with the computed exit speed for a car to leave the retarder.

Another object of the present invention is to time the front and rear trucks of each car independently and to control the respective timer controlled operating mechanisms accordingly.

Another object of the present invention is to provide an improved weight automatic car retarder structure.

Other objects, purposes and characteristics features of the present invention will be in part obvious from the accompanying drawings and in part pointed out as the invention progresses.

In describing the invention in detail, reference is made to the accompanying drawings in which similar letter reference characters are used to indicate similar parts which are generally made distinctive by preceding numerals, and in which.

For the purpose of simplifying the illustrations and facilitating in the explanation thereof, certain of the parts and circuits constituting this embodiment of the present invention have been shown diagrammatically in an arrangement to more particularly facilitate an understanding of the mode of operation of the system and the principles involved, rather than to attempt to point out all of the necessary details of construction and the specific arrangement of components that may be provided by those skilled in the art in accordance with the requirements of practice. The symbols (+) and (−) have been used to indicate connections to the positive and negative terminals respectively of suitable batteries or other sources of direct current.

Figure 1:
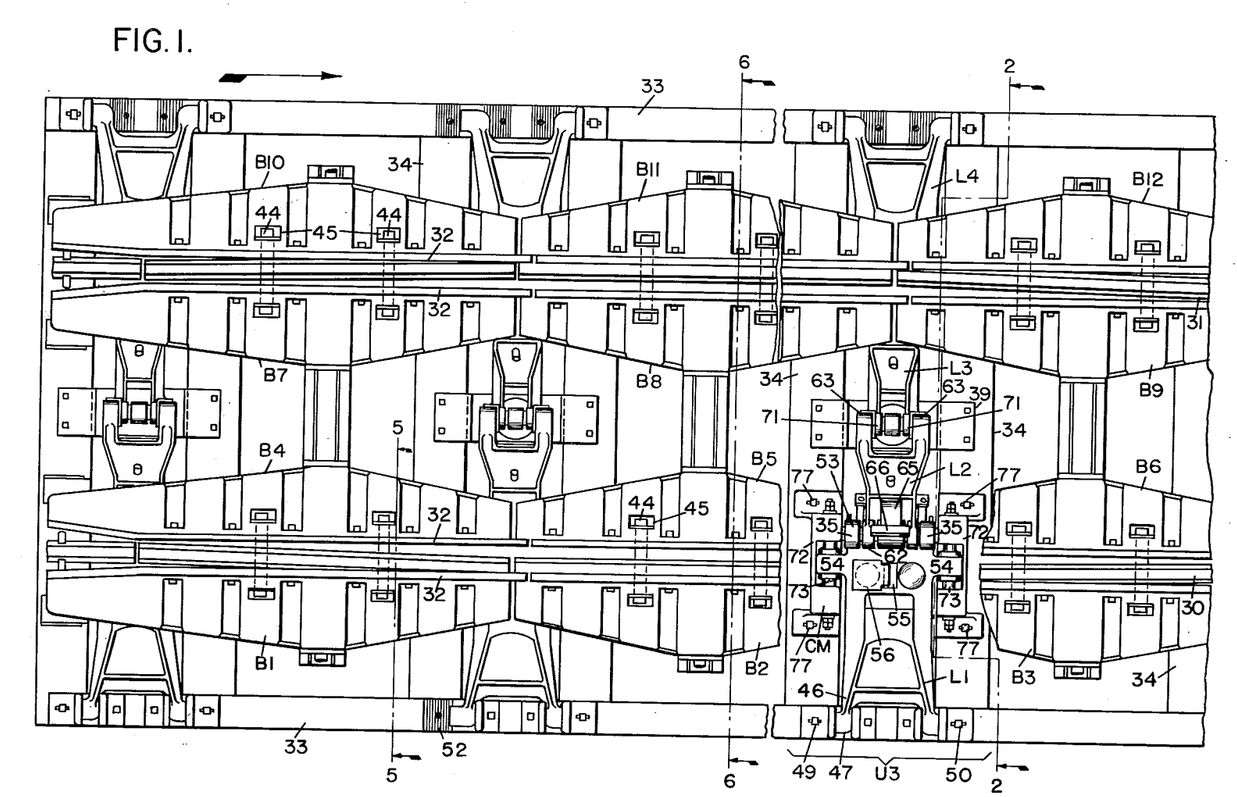
FIG. 1 is a plan view of a car retarder constructed according to the present invention with certain sections of the retarder removed for the purpose of illustrating details of the assembly of a typical operating unit.

With reference to FIG. 1, the car retarder provided by the present invention comprises several pairs of brake beams B disposed end to end along each of the track rails 30 and 31, the beams of each pair being laterally disposed, one on the inside and the other on the outside of its associated track rail. Thus the beams B1, B2 and B3 are disposed end to end on the outside of rail 30, and the beams B4, B5 and B6 are paired up with the beams B1, B2 and B3 respectively on the inside of the rail 30. Similarly, the beams B7, B8 and B9 are disposed end to end on the inside of rail 31, and the beams B10, B11 and B12 are disposed on the outside of rail 31. These beams have removable shoes 32 suitably secured to their inside surfaces for the purpose of bearing against the wheels of cars to be retarded.

The ends of the brake beams B are supported by operating units U disposed transverse of the trackway and beneath the track rails as is illustrated in FIG. 1, each of the units U comprising two oppositely disposed levers L having a common journal near their inside ends and having their outside ends supported on fixed supports such as tie plates 33. The tie plates 33 extend across the outside ends of railway ties 34 for the stretch of track in which the retarder is disposed. More specifically, with reference to FIGS. 1 and 3, a typical operating unit U3 is illustrated as having an outside lever L1 and an inside lever L2, these two levers having a common journal pin 35 at their inside ends. The outside end of the lever L1 is supported on the tie plate 33, and the outside end of the lever L2 is supported on a piston P, which is operable elevationally within a cylinder C. The cylinder C in turn has trunnions 37 at its base which are disposed in bearing blocks 38 supported in a saddle 39 secured between adjoining ties 34 at a point substantially midway between the track rails 30 and 31.

Figure 5:
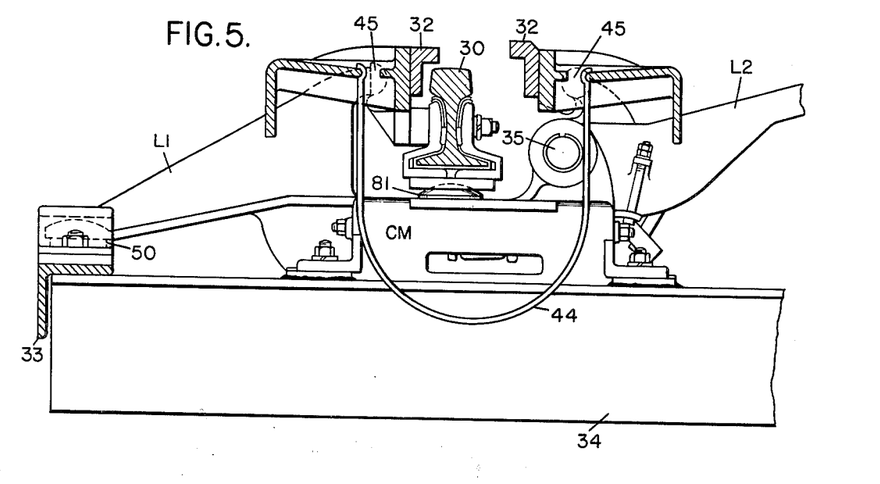
FIG. 5 is an enlarged sectional view of a portion of the retarder taken along the line 5—5 of FIG. 1.

When no car has its wheels within the brake shoes of an operating unit U, the levers L of the unit are prevented from collapse by leaf springs 40 extending longitudinally beneath both levers L. For example, with reference to FIGS. 1 and 3, two laterally spaced leaf springs 40 extend beneath the levers L1 and L2, these springs 40 being secured at one end to the underside of lever L1 by bolts 41, and at the other end to the underside of lever L2 by adjustment bolts 42 which extend through lugs 43 in the sides of the lever L2, whereby the normal elevational position of the operating mechanism is adjustable to maintain the brake beams B elevationally in the desired normal position. The brake beams B are biased away from the associated track rails by U-shaped leaf springs 44 (see FIGS. 1 and 5) engaging respective associated opposing brake beams B through openings 45 in these beams.

Figures 2, 3:
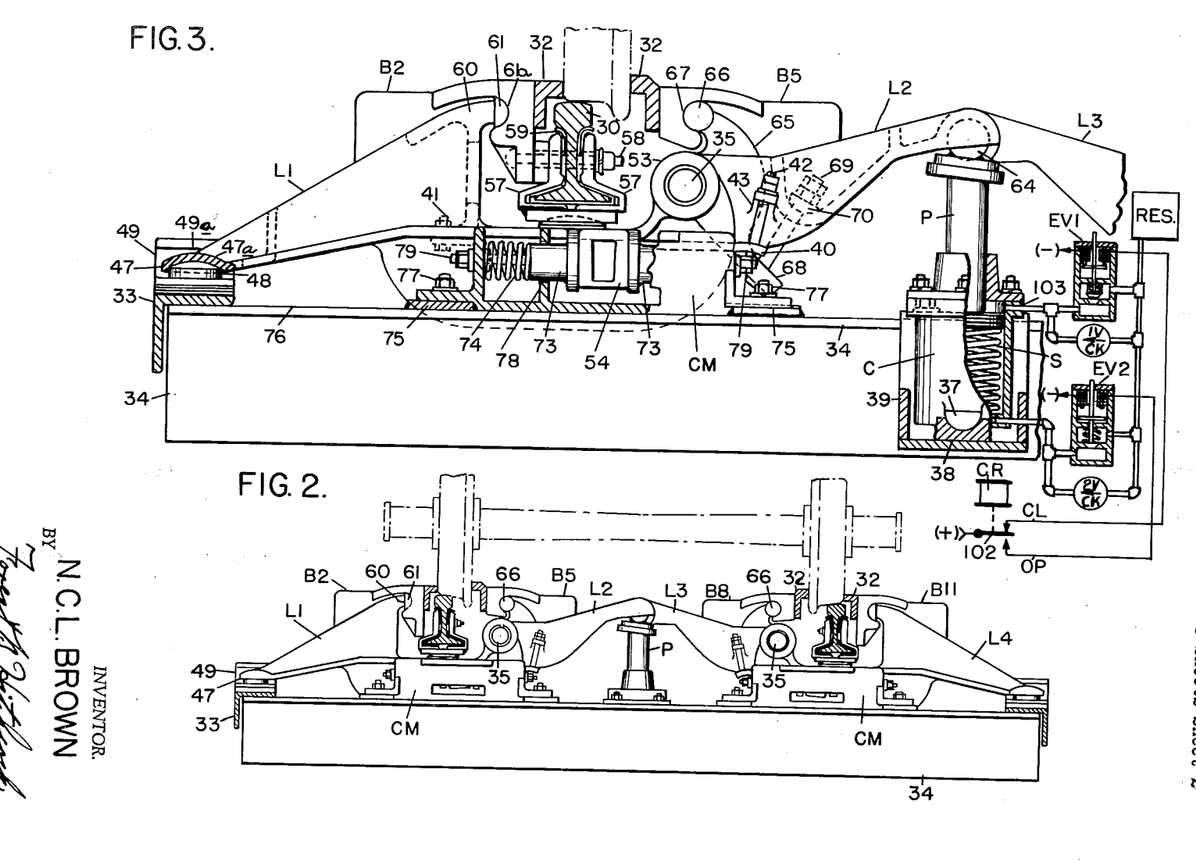
FIG. 2 is an enlarged elevational view taken along the line 2—2 of FIG. 1.
FIG. 3 is an enlarged elevational view of a portion of the view of FIG. 2 with certain parts broken away to show details of the structure.

With reference to FIGS. 1 and 3, consideration will now be given more specifically to the structure of the levers L1 and L2. The lever L1 has its outside end bifurcated to form legs 46 which terminate in feet 47. The feet 47 bear on cooperating free floating convex bearing pads 48 cooperatively in a manner to permit free pivotal movement of the lever L1 elevationally as required in opening and closing the retarder and as may be required upon retardation of cars having different width wheels. The pads 48 are flat on the bottom and are free to slide on a portion of the tie plate 33 having a smooth surface, but the tie plate 33 has serrations 52 outside of the feet 47 for adjustably securing cooperating clamps 49 which have flanges 49a extending over the feet 47. The clamps 49 are secured by bolts 50 (see FIG. 1) to the tie plate 33 so that the feet 47 are secured to the tie plate 33 in a manner to permit elevationally pivotal movement of the lever L1 but not lateral movement. As shown in FIG. 3, the top 47a of each foot 47 is convex so that it contacts the flat undersurface of the flange 49a only at a center point, thus permitting movements as mentioned above.

As is shown in FIGS. 1 and 3, the typical lever L1 extends under the track rail 31 and terminates in trunnion bearings 53 which are journaled on journal pin 35. Extending from both sides of the lever L1 at a point below the track rail 30 are lugs 54 which extend over adjoining railway ties 34. The lugs 54 serve as end thrust bearings for the associated retarder operating unit and also serve as support on the railway ties 34 for traffic through the retarder when the retarder is open.

Figure 4:
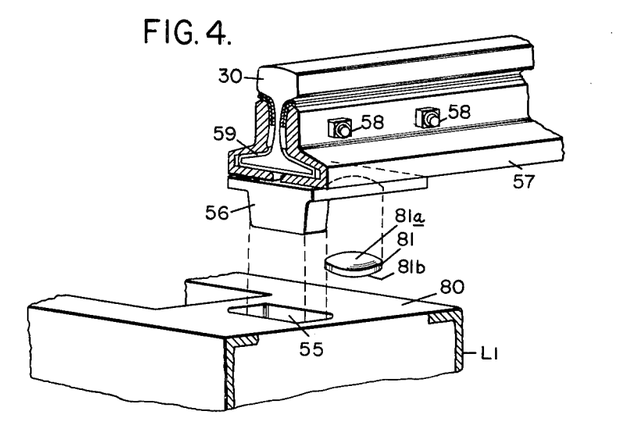
FIG. 4 is a view in exploded perspective of bearing support means for a typical track rail at an operating unit.
Figure 11A:
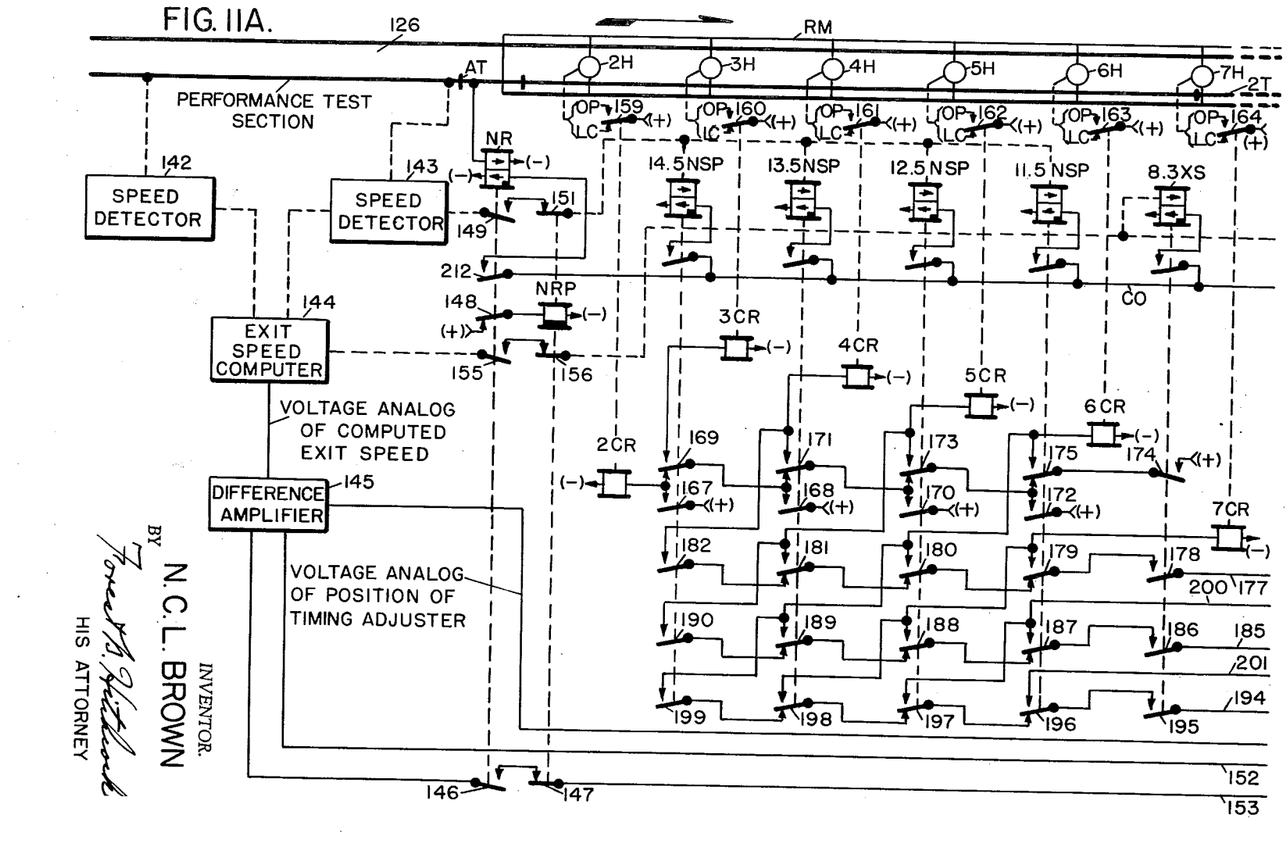
FIGS. 11A and 11B when placed side by side illustrate a circuit organization provided as one embodiment of the present invention for the control of a weight-automatic retarder.
Figure 11B:
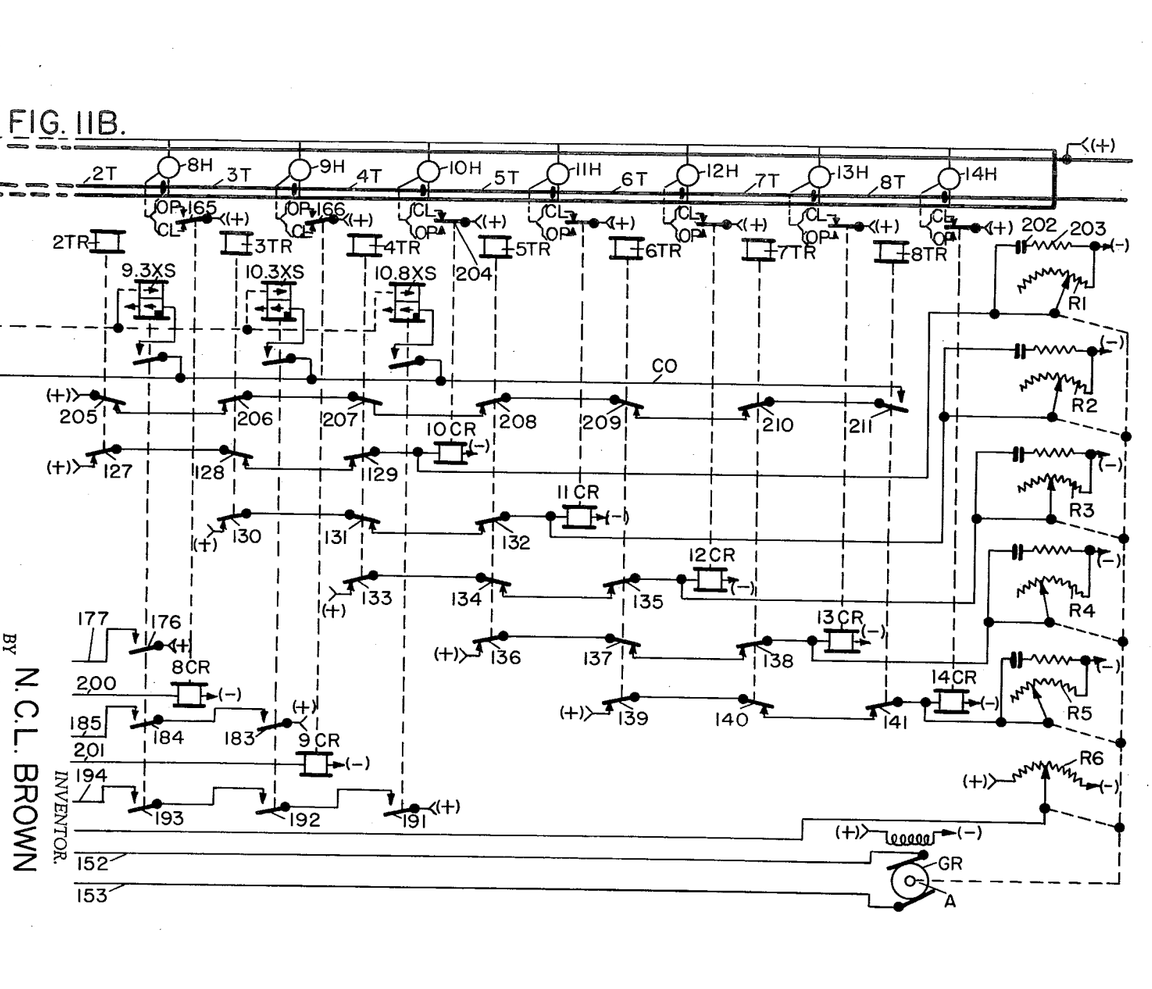

A rectangular opening 55 is provided in the lever L1 in a central location beneath the track rail 30. This opening is for the purpose of receiving bearing brackets 56 (see FIG. 4), which are in turn suitably secured, as by welding, to the underside of one of a pair of splice bars 57, which are in turn secured by bolts 58 to adjoining ends of sections of rail 30. Where insulated rail joints are required as is shown in FIGS. 11A and 11B for the establishment of timing track sections at the ends of certain of the retarder sections, insulation 59 is provided between the splice bars 57 and the rail sections of the rail 30, together with other insulation as required for the establishment of insulated rail joints.

The lever L1 is provided with an upwardly projecting abutment 60 (see FIG. 3) which bears against a half-round bearing pin 61 which in turn is secured in a socket 61a formed in each of the adjoining ends of adjoining outside brake beams B2 and B3 as a means for providing a stop for both brake beams at their adjoining point over the associated retarder operating unit, the abutment 60 cooperating partly with beam B2 and partly with the adjoining beam B3.

One end of the operating lever L2 has trunnion bearings 62 (see FIG. 1) on the journal 35, and the other end of the lever L2 has trunnion bearings 63 on a journal 64. The journal 64 is carried on the upper end of the plunger P.

A crank 65 (see FIGS. 1 and 3) is carried on the journal 35 between the trunnion bearings 62 and the lever L2. This crank has a journal 66 at its upper end cooperating with sockets 67 of the adjoining ends of inside brake beams B to support and actuate these beams. The other end 68 of the crank 65 is adjustably secured to the lever L2 by bolt 69 which has a suitable anchor 70 fitted within a cooperating socket formed in the lever L2 to permit whatever angular movement may be required for the bolt 69 when adjustment is made in connection to the crank 65 to compensate for wheel wear and the like.

The levers L3 and L4 are similar in structure to the levers L2 and L1 respectively, except that the lever L3 has trunnion bearings 71 disposed between the trunnion bearings 63 of lever L2 on the journal 35.

The outside brake beams B are secured at both ends to the associated track rails by bolts 58 as is shown in FIG. 3, these bolts also being effective as has been described to secure the splice bars 57 to the rail 30. The inside brake beams B are supported at their adjoining ends solely by the journals 66 of the cranks 65, a single journal 66 cooperating with the adjoining ends of adjoining inside brake beams B so that these adjoining ends are maintained in alignment and are operated together by the operating mechanism.

Spring biased centering mechanisms CM (see FIGS. 1 and 3) are provided for each operating unit U to maintain the track rails within limits required for proper track gauge, but yet permit the gauge to vary in accordance with different wheel widths, and in accordance with the wear of the outside brake shoes 32. The mechanisms CM also serve as thrust bearings in that they have abutments 72 to take end thrust as transmitted through the ends of the lugs 54 of the lever L1. Such an end thrust is set up as a result of the tendency of a car under retardation to drag the retarder along the trackway in the direction of motion of the car.

To consider the structure of the centering mechanisms CM more specifically, reference is made to FIGS. 1 and 3 wherein horizontally disposed opposing plungers 73 are biased by suitable springs 74 against the sides of the lugs 54 on the opposite sides of the lever L1. These mechanisms CM are secured to the surface of serrated plates 75 which are in turn welded to suitable tie plates 76 on the top of railway ties 34. The serrations are in a direction normal to the direction of traffic so that the thrust abutment 72 is adjustable to a position as illustrated in FIG. 1 contacting the ends of the lugs 54. The centering mechanisms CM are secured in their adjusted positions by bolts 77. It will be noted that the plungers 73 are operable longitudinally only to an extent limited by stops 78, and that the extent of movement is such as to permit the shifting of the gauge of the track within limits to permit changes in gauge for different width wheels and for wear of the brake shoes 32, but the stops 78 prevent a spreading of the rails to an extent to permit the gauge to become too wide for safe operation of the cars.

It will be noted that the normal lateral position of the track rail 30, for example, is adjustable by turning nuts 79 to either compress or lengthen the spring 74 of the associated plunger 73. Thus, if it is desired that the rail 30 should be normally positioned for wider gauge than is shown, for example, with reference to FIG. 3, the left-hand nut 79 of the centering mechanism CM is tightened and the right-hand nut 79 is loosened a corresponding amount. A similar adjustment may be made for the other mechanisms CM as required to obtain the desired normal disposition of the track rails. Such adjustment moves the lugs 54 of lever L1 to the left, and thus moves the rail 30 to the left, because the rail 30 moves laterally with the movement of the lever L1.

The respective sections of the rail 30 are supported at their ends on the levers L1, but a self-aligning bearing (see FIG. 4) is disposed between the base of the rail 30 and the upper surface 80 of the lever L1. This bearing comprises a bearing bracket 56 secured to each end of each rail section as has been described. Formed in the base of the bracket 56 is a convex bearing socket for cooperating with a free floating bearing pad 81, having a convex upper surface 81a and a flat base 81b which rests on the upper surface 80 of the lever L1. Thus, because of this bearing, the rail is free to maintain a vertical position while the lever L1 is raised and lowered about its left support as required to compensate for different width wheels of cars passing through the retarder.

Figure 6:
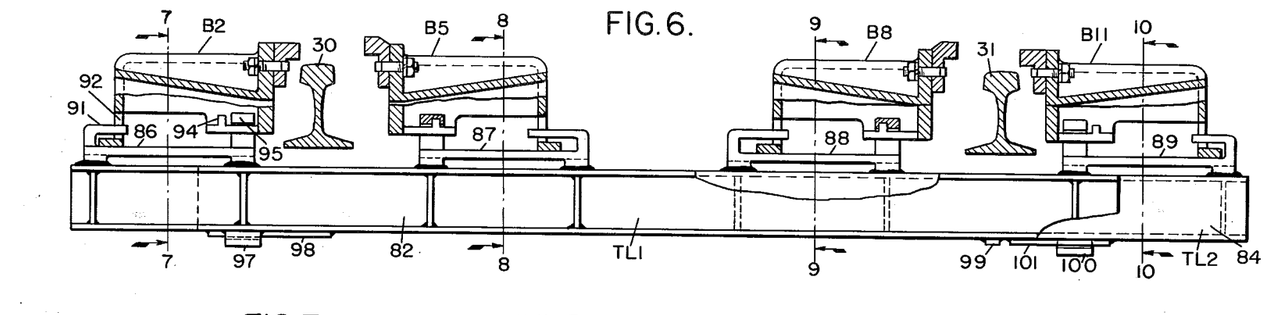
FIG. 6 is an enlarged elevational sectional view of the retarder taken along the line 6—6 of FIG. 1 with certain parts removed.

With reference to FIGS. 6–10, a structure is provided midway between the operating units U for maintaining the brake beams B relatively level, thus resisting the tendency, when retardation is applied to the wheels of a car, of the beams B to be rotated axially by the braking action. This organization comprises telescoped channel levers TL1 and TL2 extending transverse of the trackway and beneath the track rails. The outside lever TL1 comprises laterally spaced channels 82 and 83, and the inside channels TL2 comprises oppositely disposed channels 84 and 85, suitably joined at their edges as by welding. The channels 84 and 85 are disposed within a space formed between the channels 82 and 83. The brake beams B associated with the left-hand rail 30 as shown in FIG. 6, are detachably secured to the outside channel lever TL1, while the brake beams B associated with the track rail 31 are detachably secured to the inside channel lever TL2.

Hook anchors 86 and 87 are provided for anchoring the outside base edges of the brake beams B associated with rail 30 to the outside channel lever TL1, and hook anchors 88 and 89 are provided for anchoring the outside base edges of the brake beams B associated with rail 31 to the inside channel lever TL2.

Figure 7:
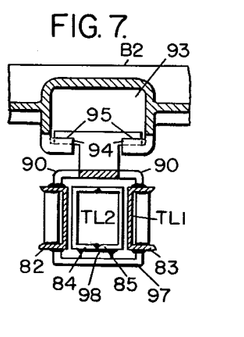
FIG. 7 is an elevational sectional view of the retarder taken along the line 7—7 of FIG. 6.
Figure 8:
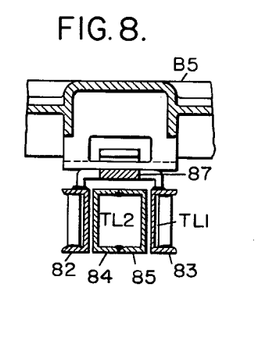
FIG. 8 is an elevational sectional view of the retarder taken along the line 8—8 of FIG. 6.
Figure 9:
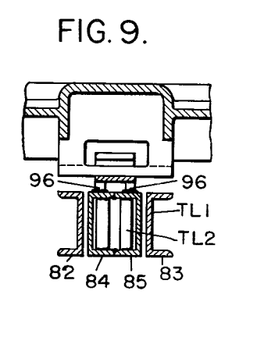
FIG. 9 is an elevational sectional view of the retarder taken along the line 9—9 of FIG. 6.
Figure 10:
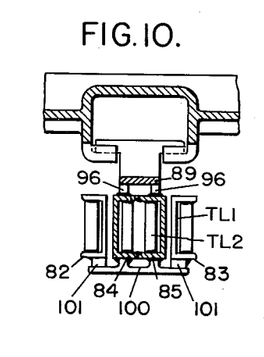
FIG. 10 is an elevational sectional view of the retarder taken along the line 10—10 of FIG. 6.

As will be readily apparent from FIGS. 6 and 7, the hook anchor 86 has base legs 90 suitably secured respectively to the outside channels 82 and 83 as by welding. A hook 91 is formed at the left-hand end of the anchor 86 and engages an opening 92 near the base of the outside of the brake beam B2. A inside hook 95 is also formed in the hook anchor 86 as is illustrated in FIGS. 6 and 7 which is inserted in an opening 93 formed in the inside base of the brake beam B2 and is maintained in position by an abutment 94 in the base of the brake beam B2. The hook anchor 87 is constructed similar to the anchor 86 and is similarly secured to the channels 82 and 83. The hook anchor 87 acts in the same manner to engage the brake beam B5 except that the hook anchor 87 is not provided with inside anchoring lugs corresponding to the lugs 95 of the anchor 86.

The structure and function of the hook anchors 89 and 88 correspond with the structure that has been described for the hook anchors 86 and 87 respectively except that the anchors 88 and 89 have legs 96 extending downwardly and welded to the inside channels 84 and 85.

With reference to FIGS. 6 and 7, the bases of the outside channels 82 and 83 are bridged by a yoke 97 which is welded to the base of the channels 82 and 83. A slide plate 98 is welded to the base of the inside channels 84 and 85. This slide plate 98 rests on the yoke 97 to permit the inside channel lever TL2 to slide axially within the outside channel lever TL1.

At the right-hand end of the levers TL1 and TL2, the channels 82 and 83 are tied together at their bases by a suitable strap 99 (see FIG. 6). The right-hand end of the levers TL1 and TL2 is supported by a yoke 100 welded to the inside beams 84 and 85 and extending beneath slide plates 101 which are secured to the respective channels 82 and 83 and bear on the yoke 100. Thus the levers TL1 and TL2 are freely suspended beneath the brake beams, and the lever TL2 is free to slide within TL1 in accordance with differences that may occur in the gauge of the track rails as has been heretofore considered.

The general principles of application of braking pressure to the wheels of a car dependent upon the car weight are similar to those described in detail in my prior U.S. patent application Ser. No. 534,750, filed September 16, 1955, now Patent No. 2,858,907, thus it is considered unnecessary to describe these principles of operation in detail. For the purpose of understanding the present invention, however, it is sufficient to state that the weight of a car on the track rails applies braking pressure to the sides of the car wheels by the weight of the car attempting to collapse the oppositely disposed levers L1 and L2, which in turn are supported when the car retarder is closed only at their outside ends, thus creating a pincers type of operation. The elevational position of the piston P of FIG. 3 determines whether the retarder is opened or closed by either causing the lugs 54 of the lever L1 to be supported by the ties 34 and thus support the weight of the car, for an open position, or by raising the lever L2 high enough for a closed position to cause the lugs 54 to be raised off of the ties 34, whereby the weight of the car is transformed by leverage to braking pressure applied to the sides of the car wheels. The distance the lugs 54 are raised above the ties 34 varies in accordance with different widths of the car wheels and thus a means is provided to compensate for different widths of wheels.

Although it is to be understood that a number of different systems may be employed for operating the car retarder provided by the present invention selectively to its open and closed positions, such as hydraulic, electric, or pneumatic means, the operating mechanism provided for this embodiment of the present invention is similar to that which is described in detail in the prior U.S. patent application of H.S. Wynn, Ser. No. 692,452, filed October 25, 1957, and now abandoned. With reference to FIG. 3, this system includes, for a typical operating unit, electrically operable hydraulic control valves EV1 and EV2, check valves 1V and 2V, and a control relay CR, in addition to a hydraulic cylinder C, plunger P, and restoration spring S.

The principle of operation of this control system is that the closing of a retarder operating unit when no car is present on the portion of the retarder operated by that unit is accomplished by the lifting of the piston P by a suitable compression spring S, subject to hydraulic valve control, and the opening of the retarder operating unit is accomplished when certain hydraulic valves are actuated by the weight of a car forcing the plunger P downwardly and compressing the spring S so as to permit the lugs 54 of the lever L1 to rest on the ties 34 and thus support the weight of the car and relieve the pressure applied by the brake beams to the car wheels. Hydraulic control means is provided to selectively lock each operating unit independently in its open or closed position.

The operating unit illustrated in FIG. 3, for example, is shown as locked in its closed position because of fluid being trapped beneath the plunger P within the cylinder C. This fluid is trapped because it cannot flow out through the check valve 2V, or out through the electric valve EV2. Valve EV2 is closed because its control circuit is opened at back contact 102 of relay CR. Thus the operating unit U3 is maintained closed until the control relay CR becomes dropped away to permit application of energy to wire OP and thus cause the opening of the valve EV2 to allow fluid to flow from the chamber in the cylinder C below the plunger P through check valve 1V to a point above piston rings 103 in the cylinder C so as to lock the retarder operating unit U3 in its open position. Fluid is trapped above the rings 103 under these conditions because the valve EV1 is deenergized at this time.

Figure 12:
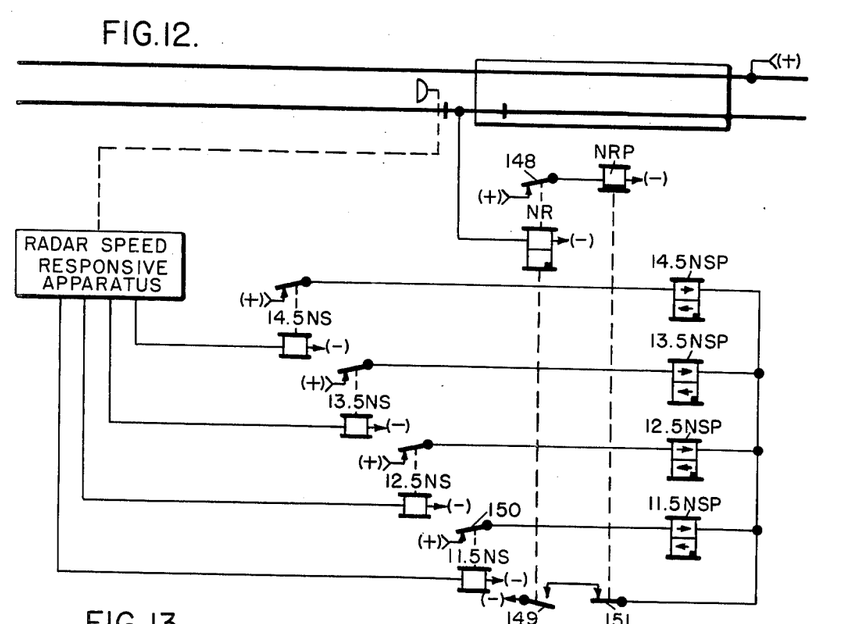
FIG. 12 illustrates control circuits for entrance speed responsive relays.
Figure 13:
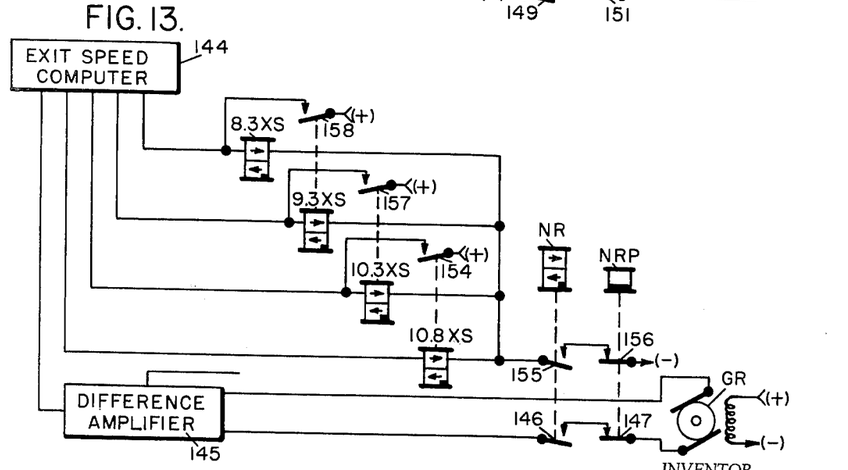
FIG. 13 illustrates control circuits for relays conditioned in accordance with a computed exit speed.

It is to be understood that the operating units U may be operated together for an entire retarder so as to open or close the entire retarder at one time, or the units U may be operated individually as is illustrated, for example, in FIGS. 11-13.

The control system as illustrated in FIGS. 11A and 11B comprises a stretch of track 126 including a car retarder RM constructed according to the present invention as has been described and having successive hydraulically operated units actuated respectively by hydraulic units 2H through 14H for traffic from left to right.

The right-hand portion of the retarder RM is divided into successive single rail track sections 2T through 8T inclusive. These track sections correspond in length respectively to the distance between successive operating units U, each track section extending from one operating unit U to the next operating unit U. Each of these track sections has a track relay TR associated therewith and controlled through a series track circuit so that these track relays TR are normally deenergized, but are picked up upon occupancy of their associated track sections.

An approach track section AT is provided at the point of entrance to the retarder RM for indicating when each car cut enters the retarder. An entrance relay NR and an associated slow dropaway back contact repeater relay NRP are associated with the approach track section AT to detect when each cut of cars enters the approach track section AT.

Radar speed responsive apparatus, including a bank of speed relays NS (see FIG. 12) is provided for reading the speed at which a car enters the retarder RM. This apparatus can be provided, for example, according to the teachings of my prior U.S. patent application Ser. No. 428,012, filed May 6, 1954. According to this system, the speed relays are controlled through high-pass filters. The preceding numerals used in identification of the relays NS are indicative of typical assumed entering speeds at which these relays may be picked up. Because of the relays NS being subject to energization for car speeds above predetermined speeds determined by the high-pass filters, all relays for lower speeds are also picked up. In other words, if the speed of a car is such as to cause the picking up of relay 13.5NS but is not high enough to cause the picking up of relay 14.5NS, the relays 12.5NS and 11.5NS are also picked up.

Each of the relays NS has a repeater relay NSP associated therewith as a back contact repeater relay so that relays NSP become picked up upon entrance of a car for all speeds above the speed at which the car is entering. The relays 14.5NSP, 13.5NSP, 12.5NSP and 11.5NSP are respectively associated with the control of the hydraulic operating units 2H through 5H respectively.

With reference to FIG. 13, a bank of exit speed relays XS is provided, the exit relays XS being picked up for typical exit speeds corresponding to speeds indicated by numerals preceding the reference characters XS applied to this bank of relays. Thus, if an exit speed of 9.3 m.p.h. has been computed for a car, for example, the relays 9.3XS and 8.3XS both become picked up, but the relays 10-3XS and 10-8XS remain in their dropped away positions. The control of the exit relays XS to provide this mode of operation should preferably be governed by a suitable exit speed computer according to a system well-known in practice for computing the desired exit speed for each car in accordance with the performance of the car in traversing a test section of track prior to the entrance of a car into the retarder.

Thus the exit relays XS are controlled in accordance with the ampltiude of the output of the exit speed computer 144. The output of the exit speed computer 144 is an analog of the desired exit speed at which a car should leave the retarder. The exit relays XS are assigned to different exit speeds and the relay is picked up corresponding to the exit speed defined by the output of the computer.

A control relay CR is provided for each of the hydraulic operating units for directly governing that unit. The specific manner in which each of the relays CR controls its associated hydraulic operating unit may be assumed to be as is shown for the control of the hydraulic operating unit of FIG. 3 by the relay CR, except that for some operating units U the units are opened upon closure of a front contact of a relay CR and closed upon closure of a back contact. The relays CR are conventional neutral relays, but of these relays CR the relays 10CR, 11CR, 12CR, 13CR and 14CR are timers in that their drop away times are selectively varied automatically. It is to be understood that other types of timers may be employed in accordance with the requirements of practice.

A motor driven gang resistor GR is provided for automatically adjusting the drop away times for certain of the relays CR, the several separate gang resistors R1, R2, R3, R4 and R5 being respectively associated with timing the drop away of the retarder control relays 10CR, 11CR, 12CR, 13CR and 14CR respectively. A potentiometer R6 is also a part of the gang combination and is provided for the purpose of furnishing a feedback voltage to a difference amplifier 145 which is provided for positioning the gang resistor GR in accordance with a voltage analog of the computed exit speed.

The relays are generally of the conventional neutral type except for the relays NSP, XS and a relay NR which are of the magnetic stick type so as to remain in their last actuated positions. It is to be understood, however, that magnetic stick relays are not required if stick circuits are provided for maintaining these relays energized under substantially the same conditions as when the magnetic stick relays are maintained in their picked up positions.

Having thus considered the general organization of the control system provided for the car retarder RM, more detail consideration will now be given to the circuit organization upon consideration of typical operating conditions.

The conditions of the system as illustrated are assumed to be the normal conditions of the system wherein the relays are normally in their dropped away positions except for the timing relays 10CR, 11CR, 12CR, 13CR and 14CR, and relay NRP.

Relay 10CR is normally maintained picked up by the energization of a circuit including back contacts 127, 128 and 129 of the track relays 2TR, 3TR and 4TR in series. Similarly relay 11CR is maintained energized through back contacts 130, 131 and 132 of relays 3TR, 4TR and 5TR. Relay 12CR is normally energized through back contacts 133, 134 and 135 of relays 4TR, 5TR and 6TR respectively. Relay 13CR is normally energized through back contacts 136, 137 and 138 of relays 5TR, 6TR and 7TR respectively. Relay 14CR is normally maintained picked up by a circuit extending through back contacts 139, 140 and 141 of relays 6TR, 7TR and 8TR respectively. In accordance with the picked up condition of each of these relays CR, energy is applied to wire CL for maintaining the corresponding retarder units closed, (see FIG. 3), the associated hydraulic operating units being conditioned so that the retarder is closed in accordance with the elevation of the associated plunger P. The retarder units U are locked in their closed positions because the associated valves EV2 are deenergized in accordance with the condition of the associated control relays CR.

When a car approaches the retarder RM it passes through a performance test section in approach of the retarder where the general performance of the car is determined, and as a result an exit speed is computed at which the car should leave the retarder RM in order to arrive at its destination at the proper coupling speed. With reference to FIG. 11A, one system for computing such an exit speed is indicated wherein a speed detector 142 detects the speed of a car upon entering a test section of trackway in approach of the retarder RM and a speed detector 143 detects the speed at which the car is travelling when it is about to enter the retarder RM. Upon comparing voltages which are analogs of these speeds, and upon consideration of numerous other factors, an exit computer 144 determines what the speed of the car should be upon leaving the retarder RM in order to arrive at its destination at a predetermined coupling speed.

The exit speed computer 144 has an output voltage that is an analog of the computed exit speed at which each car should leave the retarder RM. This voltage is available at the time when the car enters the approach track section AT for use in governing the energization of the bank of exit speed relays XS (see FIGS. 11A and 13), and for use in setting the timers 10CR, 11CR, 12CR, 13CR and 14CR. The drop-away times for these relays for any given computed exit speed decreases progressively in accordance with the relative initial adjustment of the respective adjustable resistors R1, R2, R3, R4 and R5 of the gang driven resistor GR. Once these resistors have been relatively adjusted initially to provide the proper relative timing, gang adjustment is made in accordance with the computed exit speed in accordance with an automatic control provided for the motor driven gang resistor GR to drive the rheostat in one direction or another as required to match the condition of the rheostat with a corresponding output voltage of the exit speed computer that is indicative of the computed exit speed for a car to leave the retarder. This adjustment is made through the use of a conventional difference amplifer 145 which compares a voltage input corresponding to the computed exit speed with a voltage input furnished by the potentiometer R6, which is in turn driven by the operating mechanism of the motor driven gang resistor GR. The output of the difference amplifier 145 is zero when the motor gang resistor GR has reached a proper position in correspondence with the position required by the computed exit speed. An output of the difference amplifier 145 is provided of one polarity or the other as required to drive the motor gang resistor GR in one direction or the other to match the voltage selected by the poteniometer R6 to the voltage analog of the computed exit speed.

The positioning of the gang resistor GR by the difference amplifier 145 is effective only upon entrance of a car cut into the retarder RM because of the front contacts 146 and 147 of relays NR and NRP being included in series in the connection of the output of the difference amplifier 145 over wires 152 and 153 to the armature A of the motor of the gang resistor GR. Relay NRP is normally picked up through back contact 148 of relay NR. This relay is made sufficiently slow in dropping away to remain picked up after the opening of its pick-up circuit for a time interval sufficient to insure the proper operation of the gang resistor GR by the output of the difference amplifier 145. Thus the entrance of a car into the approach section AT picks up relay NR by energization of a conventional single rail series track circuit, and upon closure of front contact 146, the above described circuit for the armature A of the gang resistor GR becomes energized. After a time sufficient for the gang resistor GR to be driven to its proper postion in correspondence with the computed exit speed, relay NRP drops away and opens the circuit at front contact 147. Relay NR remains picked up until the car leaves the retarder RM.

The magnetic stick repeater relays NSP are assumed, as a typical condition, to be subject to energization when the speed of a car entering the retarder is above the speed indicated in m.p.h. by the preceding numerals in the reference characters for these relays. Thus, for example, if the entering speed of a car is 13 m.p.h., the relays 12.5NSP and 11.5NSP are picked up, but the relays 14.5NSP and 13.5NSP remain in their dropped-away positions because they are provided for car speeds above the assumed entering speed of a car.

The pick-up circuits for the relays NSP are shown in FIG. 12 wherein relays NSP are illustrated as being back contact repeater relays respectively of a bank of speed relays NS. The speed relays NS are controlled by suitable speed responsive apparatus such as radar, and the preceding numerals of the reference characters of the relays NS can be considered as indicative of typical car speeds above which these relays are maintained energized. The control of the relays NS in this manner can be as is shown, for example, in the prior U.S. patent application of H. C. Kendall et al., Ser. No. 369,162, filed June 2, 1953, now patent No. 3,125,315. The corresponding relays of the Kendall et al. application are the relays HS1, MS1 and LS1 of FIG. 2B. The bank of entering speed relays NS is subject to energization upon the approach of a car to the retarder, and at the point just prior to entrance of a car into the retarder, the actuation of the entering relay NR closes front contact 149 (see FIG. 12) to render the conditioning of the bank of relays NSP to be effective. Thus relays NSP are picked up at this time for all car speeds below the speed at which the car is entering the retarder, relay 11.5NSP being subject to energization of a circuit extending from (+) including back contact 150 of relay 11.5NS, upper winding of relay 11.5NSP, front contact 151 of relay NRP and front contact 149 of relay NR, to (−). This circuit is only momentarily energized until the dropping away of relay NRP because of the opening of its circuit at back contact 148 of relay NR, but because of the relays NSP being of the magnetic stick type they are maintained in their positions corresponding to the entering speed of the car until the car leaves the retarder. The relays NSP are not, however, subject to change in control because of the change in speed that takes place as the car progresses within the retarder because of the pick up circuits for these relays being opened at front contact 151 of relay NRP.

The bank of exit relays XS is selectively conditioned when a car enters the retarder in accordance with the computed exit speed as determined by the exit speed computer 144 (see FIG. 11A). The exit relays XS have been identified by preceding numerals which may be considered as a specific example to represent typical computed exit speeds in m.p.h. at which the associated relay will be picked up when that exit speed is designated by the exit speed computer 144. Upon the picking up of an exit relay XS in accordance with an exit speed computed by the computer 144, the relays XS for all lower exit speeds are also picked up. Thus, with reference to FIG. 13, if the relay 10.8XS is picked up by the output of the exit speed computer as being indicative of an exit speed of 10.8 m.p.h. or higher, relay 10.3XS also becomes picked up by the energization of a circuit extending from (+), including front contact 154 of relay 10.8XS, upper winding of relay 10.3XS, front contact 155 of relay NR, and front contact 156 of relay NRP, to (−). This circuit becomes opened upon the dropping away of relay NRP after a short time interval so that the relays XS, like the entrance relays NS, are conditioned only upon entrance of a car into the retarder. Similarly in a cascade manner the closure of front contact 157 of relay 10.3XS causes the picking up of the speed relay 9.3XS for the next lower exit speed, and when that relay becomes picked up, it in turn causes the picking up of relay 8.3XS by the closure of front contact 158.

In determining the rough adjustment of the retarder, the operating units U governed by hydraulic operators 2H through 9H (see FIGS. 11A and 11B) are selectively opened or maintained closed in accordance with both the entering speed and the computed exit speed for each car. When the system is at rest, with no cars present, the operating units U governed by the hydraulic operators 2H through 9H are in their closed positions because of energy being applied to these operators through back contacts 159-166 of relays 2CR-9CR respectively.

If the entering speed of a car is above the speed for actuation of any of the relays NSP, these relays remain in their dropped away positions, and if the computed exit speed for the car is below that required to pick up the lowest speed exit relay 8.3XS, the exit speed relays XS all remain in their dropped away positions. With no relays NSP or XS picked up, the retarder control relays 2CR through 9CR remain in their dropped away positions so that all of the associated retarder operating units U are maintained closed to provide maximum braking for this first portion of the retarder.

If the entering speed of a car is just below 14.5 m.p.h. (assuming a low computed exit speed as above) only relay 14.5NSP becomes picked up in accordance with the entering speed, and the picking up of this relay causes the picking up of relay 2CR by the closure of front contact 167. The picking up of relay 2CR applies energy through front contact 159 to the hydraulic operator 2H to operate the corresponding operating unit U to its open position. The other retarder operating units U remain closed.

If the entering speed of a car is just below 13.5 m.p.h. (assuming a low computed exit speed as above), relays 14.5NSP and 13.5NSP become picked up. The picking up of relay 14.5NSP causes the picking up of relay 2CR to open the operating unit controlled by the hydraulic operator 2H as has been described. Relay 3CR for the operating unit U controlled by the hydraulic operator 3H is also picked up by the energization of a circuit extending from (+), including front contact 168 of relay 13.5NSP, front contact 169 of relay 14.5NSP, and winding of relay 3CR to (−). The picking up of relay 3CR opens the operating unit U governed by the hydraulic operator 3H in accordance with the closure of front contact 160.

If the entering speed of a car is just below 12.5 m.p.h. (assuming a low computed exit speed as above) relays 14.5NSP, 13.5NSP and 12.5NSP become picked up, and the picking up of these relays causes the opening of the retarder operating units governed by hydraulic operators 2H and 3H as has been described, and in addition the relay 4CR becomes picked up by the energization of a circuit extending from (+), including front contact 170 of relay 12.5NSP, front contact 171 of relay 13.5NSP and winding of relay 4CR, to (−). The picking up of this relay causes the operating unit governed by the hydraulic operator 4H to be opened in accordance with the closure of front contact 161.

If the entrance speed of a car is just below 11.5 m.p.h. (assuming a low computed exit speed as above) the operating units governed by hydraulic operators 2H, 3H and 4H become opened as has been described, and in addition the relay 5CR becomes picked up to actuate the hydraulic operator 5H by the closure of front contact 162 so as to open the associated operating unit U. The circuit by which relay 5CR becomes picked up at this time extends from (+), including front contact 172 of relay 11.5NSP, front contact 173 of relay 12.5NSP and winding of relay 5CR, to (−).

To consider how the hydraulic operators 2H through 9H are governed in accordance with the computed exit speed, the mode of operation under different typical computed exit speed conditions will be assumed. If it is assumed that the computed exit speed is just above 8.3 m.p.h. only the relay 8.3XS of the bank of exit speed relays is picked up, and the picking up of this relay energizes the retarder control relay 2CR (assuming maximum entering speed) by the closure of a circuit extending from (+), including front contact 174 of relay 8.3XS, back contact 175 of relay 11.5NSP, back contact 173 of relay 12.5NSP, back contact 171 of relay 13.5NSP, back contact 169 of relay 14.5NSP, and winding of relay 2CR, to (−). The picking up of relay 2CR opens the retarder operating unit U that is governed by the hydraulic operator 2H in accordance with the closure of front contact 159. It will be readily apparent that additional control relays CR may be picked up as has been described for opening various operating units in accordance with a lower entering speed of a car entering the retarder.

If the computed exit speed is a little over 9.3 m.p.h., the exit speed relays 9.3XS and 8.3XS both become picked up, the relay 8.3XS providing for the energization of relay 2CR as has been described, and the picking up of relay 9.3XS being effective, provided the entering speed is lower than 14.5 m.p.h., to pick up one or more additional control relays CR. For example, if the entering speed is just below 14.5 m.p.h., the relay 14.5NSP is picked up, and in addition to the energization of the relays 2CR and 3CR, relay 4CR becomes energized to close its front contact 161 and actuate the hydraulic operator 4H to open the associated car retarder unit U. The circuit by which relay 4CR becomes picked up under these conditions extends from (+), including front contact 176 of relay 9.3XS, wire 177, front contact 178 of relay 8.3XS, back contact 179 of relay 11.5NSP, back contact 180 of relay 12.5NSP, back contact 181 of relay 13.5NSP, front contact 182 of relay 14.5NSP and winding of relay 4CR, to (—). Thus it will be apparent from the circuits that have been described, that operating units are opened in accordance with the entering speed as has been heretofore considered, and in addition one or more adjoining operating units is opened in accordance with the computed exit speed. Thus if only one exit relay XS is picked up, one additional operating unit is opened, if two exit relays XS are picked up, two additional operating units are open, etc.

To consider the circuit organization further, if the computed exit speed is just above 10.3 m.p.h., and the entering speed is such as to have picked up only the entrance speed relay 14.5NSP, in addition to the energization of relays CR as has just been described, the relay 5CR becomes picked up to close its front contact 162 and energize the hydraulic operator 5H to open the retarder operating unit U associated therewith. The circuit by which relay 5CR is picked up under these conditions extends from (+), including front contact 183 of relay 10.3XS, front contact 184 of relay 9.3XS, wire 185, front contact 186 of relay 8.3XS, back contacts 187, 188 and 189 of relays 11.5NSP, 12.5NSP and 13.5NSP respectively, front contact 190 of relay 14.5NSP and winding of relay 5CR, to (—).

If the exit speed is a little above 10.8 m.p.h., all of the exit relays XS are picked up, and with the entering speed relay 14.5NSP in its picked up position, the retarder control relay 6CR becomes picked up to open the retarder operating unit governed by the hydraulic operator 6H in accordance with the closure of front contact 163. The circuit by which the relay 6CR becomes picked up extends from (+), including front contact 191 of relay 10.8XS, front contact 192 of relay 10.3XS, front contact 193 of relay 9.3XS, wire 194, front contact 195 of relay 8.3XS, back contacts 196, 197 and 198 of relays 11.5NSP, 12.5NSP and 13.5NSP respectively, front contact 199 of relay 14.5NSP and winding of relay 6CR, to (—).

Although the above described circuits for the opening of various operating units in accordance with different computed exit speeds has been described as being effective under conditions where only the entering speed relay 14.5NSP of the entrance speed relays is picked up, it should be readily apparent from the circuits that have been described that when additional entrance speed relays are picked up, additional car retarder operating units are opened accordingly. For example, the relay 7CR can be picked up for opening the car retarder unit governed by the hydraulic operating mechanism 7H provided that the entering speed is such as to cause the relay 13.5NSP to be picked up, and provided that all of the exit speed relays XS are in their picked up positions. The circuit by which relay 7CR is picked up under these conditions extends from (+), including front contact 191 of relay 10.8XS, front contact 192 of relay 10.3XS, front contact 193 of relay 9.3XS, wire 194, front contact 195 of relay 8.3XS, back contacts 196 and 197 of relays 11.5NSP and 12.5NSP respectively, from contact 198 of relay 13.5NSP and the winding of relay 7CR, to (—).

If the entering speed is still lower so that relay 12.5NSP is picked up, and if all of the exit relays XS are in their picked up positions, relay 8CR becomes picked up to open the retarder operating unit governed by the hydraulic operator 8H. The circuit by which relay 8CR becomes picked up under these conditions includes front contact 191, 192 and 193 of relays 10.8XS, 10.3XS and 9.3XS respectively, wire 194, front contact 195 of relay 8.3XS, back contact 196 of relay 11.5NSP, front contact 197 of relay 12.5NSP, wire 200 and winding of relay 8CR.

If the entering speed is still lower so as to cause all entering speed relays NSP to be picked up, and if it is assumed that all of the exit speed relays XS are picked up, the hydraulic operator 9H is actuated to open the associated car retarder unit in accordance with the closure of front contact 166 of relay 9CR. Relay 9CR is picked up under these conditions by the energization of a circuit including front contacts 191, 192 and 193 of relays 10.8XS, 10.3XS and 9.3XS respectively, wire 194, front contact 195 of relay 8.3XS, front contact 196 of relay 11.5NSP, wire 201 and winding of relay 9CR.

Upon a car entering the track section 2T which is immediately in approach of the hydraulic operator 8H, the series track relay 2TR becomes picked up, and the picking up of this relay starts the timing of the drop away of relay 10CR in accordance with the opening of the circuit for that relay at back contact 127. The winding of relay 10CR is, however, shunted by a timing circuit including the adjustable resistor R1 which is positioned, as has been described, in accordance with the computed exit speed so as to select the proper timing for each car for the drop away time of relay 10CR. Connected in multiple with the variable resistor R1 is a suitable condenser 202 connected in series with a resistor 203 to store a voltage charge when relay 10CR is energized, and to discharge into the winding of relay 10CR at a rate determined by the time constant of the circuit together with the resistance of the variable resistor R1 that is connected in multiple with this circuit. Thus the timing of the relay 10CR is initiated by the first wheel of the front truck of a car when it enters track section 2T, and as the car progresses into track section 3T, the timer is still maintained in operation by the opening of back contact 128, and similarly the timing is also effective during the occupancy of track section 4T because of the opening of back contact 129 of the track relay 4TR.

If the relay 10CR has time to be dropped away when its picked up circuit is open as has been described, the hydraulic operator 10H is energized by the closure of back contact 204 to open the associated car retarder operating unit. If there is time for this car retarder operating unit to be opened, it is maintained open until the second axle of the first truck of the car has left the track section 4T so that the track relays 2TR, 3TR and 4TR can be contemporaneously in their dropped away positions. This condition will always be reached between the front and rear trucks of a car because the total length of the three timing track sections in series is less than the distance between the wheels of the front and rear trucks.

A car will be generally travelling fast enough so that the time will not expire for the relay 10CR while the first truck of the car is within one of the timing sections 2T, 3T, or 4T, and thus generally full retardation is provided for the first truck of a car by the section of the retarder governed by the hydraulic operator 10H. When the rear truck of a car passes through these timing sections, however, the same mode of operation as described above is effected, but because of the car having progressed farther into the retarder, it is travelling at a lower speed, and the hydraulic operator 10H can very well release its associated operating unit before the rear trucks of the car have passed out of the timing sections 2T, 3T and 4T, and thus relieve the braking pressure applied to the rear trucks of the car upon expiration of the time interval timed by relay 10CR.

It is assumed that the lengths of the retarder sections, and thus the lengths of the timing track sections, is a little greater than the maximum spacing between the axles of a car truck. Thus, the second axle of a car truck leaves track section 4T, for example, just prior to the entrance of the first axle of the truck into the track section 6T. At this time the track relays 2TR, 3TR and 4TR are all in their dropped away positions and the timing relay 10CR is reenergized, and thus is properly conditioned for the timing of the passage of the rear truck of the car.

Having thus described specifically the mode of operation of the timing relative to the relay 10CR, it will be readily apparent that a similar mode of operation is provided by the timers 11CR, 12CR, 13CR and 14CR as the car progresses, these timers being initiated successively, one for each track section a car truck enters, as the car progresses. Thus the timer 11CR is initiated upon the entrance of the car into track section 3T upon the picking up of relay 3TR to open back contact 130, and the timers 12CR, 13CR and 14CR are similarly initiated by the opening of back contacts 133, 136 and 139 of relays 4TR, 5TR and 6TR respectively.

When a car is about to leave the retarder, as is indicated by only the track section 8T being occupied, a clearout bus CO is energized to reset all of the magnetic stick relays and thus condition the system for control in accordance with the approach of the next car. Energy is applied to this bus through back contacts 205 through 210 of relays 2TR through 7TR respectively and through front contact 211 of relay 8TR. Each of the magnetic stick relays that is in its picked-up position at this time is driven to a dropped away position by energy feeding through a front contact of that relay from the clearout bus CO. Thus the entrance relay NR, for example, is actuated to its dropped away position by energy feeding through its lower winding and through its front contact 212 from the clearout bus CO. This relay when dropped away closes its back contact 148 and causes the picking up of the entrance repeater relay NRP.

Figure 14:
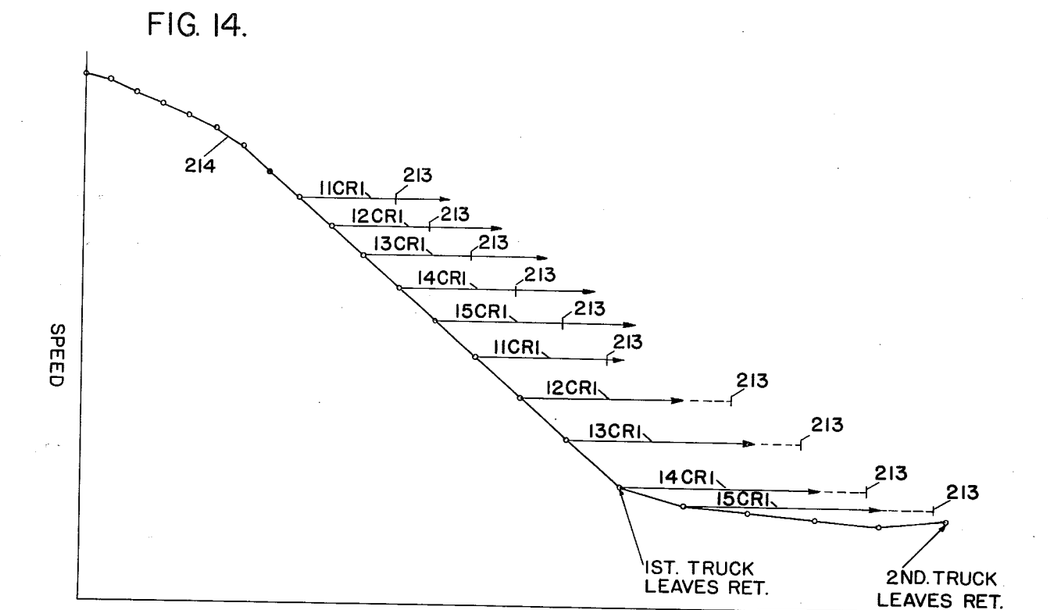
FIG. 14 is a deceleration curve for a particular car in passing through the retarder in order to leave at a particular computed exit speed.
Figure 15:
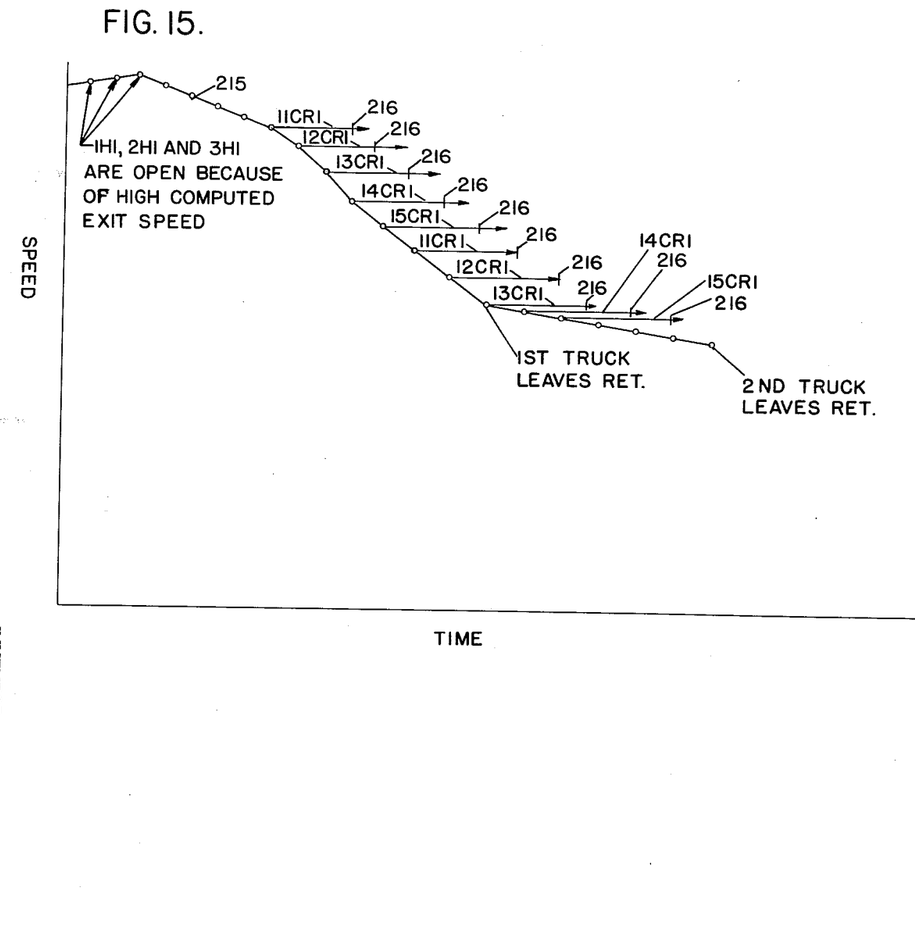
FIG. 15 is a deceleration curve for a car in passing through the retarder in order to leave at a different computed leaving speed; and, FIG. 16 is a diagram of a car retarder constructed according to the present invention for which the curves of FIGS. 14 and 15 are computed.
Figure 16:
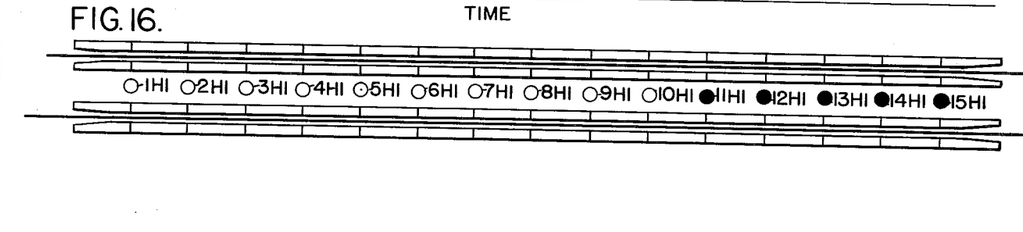

FIGS. 14 and 15 illustrate, by combination speed curves and timing charts, the action of the retarder shown in FIG. 16 upon the passage of two identical cars, both cars entering the retarder at the same speed, but the car having its speed indicated in FIG. 14 by the curve 214 is assumed to be for a classification track requiring a release speed approximately four miles per hour lower than the release speed for the car having its speed indicated by the curve 215 of FIG. 15. Thus, the car according to the curve 215 of FIG. 15 requires less retardation than the car according to the curve 214 of FIG. 14, even though its performance through the test section and its speed when entering the retarder is the same.

With reference to FIG. 16, the car retarder for which the curves 214 and 215 of FIGS. 14 and 15 are computed has a few more operating units than the car retarder that has been described, but the mode of operation is assumed to be substantially the same. The car retarder according to FIG. 16 has hydraulic operators 1H1 through 15H1, of which the hydraulic operators 11H1 through 15H1 are timer controlled by timing circuit comparable to the circuits that have been described, the other hydraulic operating mechanisms being controlled in accordance with entrance speed and computed exit speed by the mode of operation that has been described for comparable hydraulic operating units.

In FIGS. 14 and 15, the horizontal lines from the circles on the curve to the points of the arrows indicate the time interval or running out of the timers CR1 which actuates the associated retarder units U to the open position. (The timing starts with the circle on the curve and ends at the point of the arrow.)

Lines 213 indicate the position of a truck in the retarder unit from a time standpoint and denotes whether retardation is or is not applied by that unit. If the truck passes through the retarder unit in a period of time shorter than allotted by the timer retardation is applied and such a condition exists with the first truck in most cases. (Line 213 crosses the solid timing line.) If the truck uses more time in passing through the retarder unit only partial retardation is applied and such a condition exists with the second truck in most cases. (Line 213 crosses the dotted extension of the timing line.)

Stated in other terms full retardation in a retarder unit is applied when the time of travel is shorter or equal to the time interval and partial or no retardation is applied when the time of travel is longer than the time interval. The time interval is a function of the specified exit speed and controls each retarder unit to allow the car to run free when its speed is synchronous with the time intervals.

The lines 213 intersecting the arrows for the various timing relays CR1, or intersecting a dotted projection of the arrows, is indicative of the time when the associated timer CR1 becomes reenergized because of the second axle of the car truck being timed having cleared the third track section that is used to control the associated timer. It is thus indicated, for example, by the first group of five arrows in FIG. 14 that the timers 11CR1 through 15CR1 are reenergized before their respective drop-away times have been reached, and thus the hydraulic operators H1 with which these timers are associated do not open their associated retarder operating unit for the first truck of the car. Under these conditions full braking is applied to the first truck of the car throughout the retarder length. The operation of the timers 11CR1 through 15CR1 for the second time as illustrated in FIG. 14 is actuated by the second truck of the car; and because the car has had its speed materially retarded by this time, it is going slow enough so that for certain of the timers, the time expires and the associated retarder operating units are opened before the truck leaves the associated timing track sections to permit reenergization of these timers. This condition is indicated in FIG. 14 by the lines 213 intersecting a dotted projection of the arrows indicative of the time consumed by the timers CR1 when timing the second truck, thus indicating a time interval during which the timing relays CR1 are deenergized and the associated car retarder operating units are open. It will be noted that the rear truck leaves the timing sections for the relay 11CR1 prior to the expiration of the time of operation for this timer, and thus the timer 11CR1 does not open its associated car retarder operating unit for the second truck, but for the timers 12CR1 through 15CR1, the time expires prior to the truck vacating the control track sections for these respective timers. The points on the curves indicated by small circles are indicative of the successive operating units U that are traversed upon passage of the car.

It will be noted upon consideration of the curve 214 and timing chart of FIG. 14 that the lines 213 indicate when the rear axle of the truck is directly over the operating unit controlled by the associated timer CR1. This operating unit governs the application of retardation to the car for both of the retarder sections adjoining that unit and thus upon considering the time during which the operating unit is closed or opened to one side or the other of the lines 213, it will be readily apparent as to what percentage of the various retarder sections are used during the retardation of the respective trucks of the car.

It will be noted that the slope of the curve 214 of FIG. 14 and of the curve 215 of FIG. 15 is also determined by the number of car axles under retardation at times when the car is entering the retarder and at times when it is leaving, the time at which the first and second trucks leave the retarder respectively being indicated in both FIGS. 14 and 15.

To consider more specifically the conditions under which the retarder is operated differently for the car according to FIG. 15, it will be noted that the car actually increases in speed after entering the retarder because the retarder operating units governed by the hydraulic operators 1H1, 2H1 and 3H1 are open.

Thus, on account of the exit speed for the car being higher, the exit speed relays have opened the operating units governed by the hydraulic operators 1H1, 2H1 and 3H1 because the full length of the retarder is not required in order to reduce the car to the computed exit speed; and it is desirable that the leaving end of the retarder be used rather than the entering end because it is important that the car leave the retarder at as closely as possible the exact computed exit speed. Also because of the exit speed being different than for the car according to FIG. 14, the timers have different settings as adjusted automatically by the gang resistor GR so that the retarder operating units will be opened at the proper times. It will be noted, however, that even for the passage of the second truck of the car according to the curve 215 of FIG. 15 the exact amount of retardation is applied without opening any of the retarder operating units. This is because the lines 216 which are comparable to the lines 213 of FIG. 14 intersect the arrows indicative of the duration of the timing for the different timers before or substantially at the time of operation, rather than occurring at a time after the timing has been completed as was found in FIG. 14. It is therefore illustrated in FIG. 15 that the exact computed exit speed is obtained for a car without-operating the timer controlled units because of only a selected portion of the retarder being used.

Having thus described a weight-automatic car retarder and a control system employing such a car retarder as one embodiment of the present invention, it is to be understood that various adaptations, alterations and modifications may be applied to the specific form shown in accordance with the requirements of practice within the spirit or scope of the present invention except as limited by the apending claims.

What I claim is:

1. A car retarder control system comprising a retarder in a stretch of track having a plurality of shoe beams disposed end to end along both sides of a track rail, an independent operating unit at each point where ends of said shoe beams are adjoining selectively operable to closed and open positions for actuating the associated shoe beams to braking and nonbraking positions respectively, computing means for computing the amount of retardation required for each car in accordance with the performance of the car in approaching the retarder, adjustable timing means for each of several of the operating units for governing the duration of closure of the associated operating unit for the passage of each car, and circuit means for adjusting said timing means in accordance with the condition of said computing means.

2. A car retarder control system comprising a retarder in a stretch of railway track having a plurality of car retarding sections adjoining end to end, a track section corresponding to each of the retarding sections, an operating unit for each of the retarding sections operable to braking and nonbraking positions, computing means for determining an analogue of the desired exit speed at which each car should leave the retarder in order to arrive at its destination at a proper coupling speed, a normally inactive timer for each of the operating units operable when rendered active for a time interval determined by the condition of said computing means, circuit means for rendering said timer active whenever any one of a predetermined plurality of adjoining track sections in approach of the associated operating unit is occupied by the wheels of a car, said circuit means being effective to restore said timer to its normally inactive condition when said plurality of adjoining track sections are unoccupied, and means effective after said timer has completed its timing operation subsequent to being initiated for operating the associated operating unit to said nonbraking position.

3. A car retarder control system comprising a retarder in a stretch of track having a plurality of shoe beams disposed end to end along at least one side of a track rail, an independently operable operating unit at each point where ends of said shoe beams are adjoining selectively operable to actuate the associated shoe beams to braking and non-braking positions, computing means for determining an analogue of the desired exit speed at which each car should leave the retarder in order to arrive at its destination at a proper coupling speed, means for selectively opening certain ones of said operating units near the entering end of the retarder in advance of a car in accordance with the computed car speed, timing means provided for the other of said operating units respectively and initiated upon the approach of a car for opening the associated units upon expiration of respective predetermined time periods, and means for predetermining the extent of said time periods in accordance with the car exit speed computed by said computing means.

4. A car retarder control system comprising a retarder in a stretch of railway track having a plurality of shoe beams disposed end to end along both sides of a track rail, an independent operating unit at each point where ends of said shoe beams are adjoining selectively operable to closed and open positions for actuating the associated shoe beams to braking and non-braking positions respectively, control means for selectively actuating at least one of said operating units near the entrance end of the retarder for a given direction of traffic to its open or closed position in accordance with the speed of a car upon entering the retarder, computing means for computing the exit speed at which each car should leave the retarder in accordance with the performance of the car in approaching the retarder, adjustable timing means for the other operating units respectively for governing the duration of closure of the associated operating unit for the passage of each car, and circuit means for adjusting said timing means for each car in accordance with the condition of said computing means.

5. A car retarder control system comprising a retarder in a stretch of railway track having a plurality of shoe beams disposed end to end along a track rail, several independent retarder operating units extending transversely under the track rail for supporting the several adjoining ends of the shoe beams, said operating units being operable selectively to open and closed positions corresponding to non-braking and braking positions of the shoe beams respectively, entering speed means for detecting the speed at which a car enters the retarder, exit speed computing means for computing an analogue of the desired exit speed at which a car should leave the retarder in order to arrive at its destination at a proper coupling speed, means for selectively opening certain of said operating units near the entering end of the retarder in advance of a car jointly in accordance with the condition of said entering speed means and in accordance with the computed car exit speed, and timing means for selectively opening the other of said operating units as required to cause each car to leave the retarder at its computed exit speed.

6. A car retarder control system comprising, a car retarder in a stretch of track having a plurality of shoe beams adjoining end-to-end along both sides of a track rail, there being a performance stretch of track in approach of the retarder for a given direction of traffic for determining the rolling resistance of each car as it approaches the retarder, an operating unit at each point where ends of said shoe beams are adjoining selectively operable to closed and open positions for actuating the associated shoe beams to braking and nonbraking positions respectively, performance detecting means for determining the performance of each car as it passes through said performance stretch of track in approach of the retarder, computing means responsive to said performance determining means for computing an analog of exit speed for each car to leave the retarder in accordance with the performance of the car while approaching the retarder, and timing means for the several retarder units for determining the time interval during which braking is applied to a car by that unit in accordance with the condition of said computing means.

7. A car retarder control system according to claim 6 wherein there is at least one track circuit in approach of several of the operating units and occupancy by a car of that track circuit initiates the timing of said timing means for that unit.

8. A car retarder control system according to claim 7 wherein the timing means for each unit is initiated when the car is in approach of the next preceding operating unit.

9. A car retarder control system according to claim 6 wherein the timing means includes normally energized timing devices for the several operating units which have their drop away times selectively variable in accordance with the condition of said computing means.

10. A car retarder control system for the control of a car retarder disposed at an intermediate point in a stretch of railway track having traffic in a given direction, said car retarder comprising a plurality of braking sections and an operating unit for each of the sections, said operating units being operable to actuate the associated sections selectively to braking and nonbraking positions comprising, control means for each of the operating units effective to maintain the associated operating unit normally in a braking position when there is no car present within the retarder or within the immediate approach to the retarder, performance detecting means for detecting the performance of each car as it passes through said stretch of track in approach of the retarder, computing means responsive to said performance detecting means for computing an anlog of the exit speed for each car to leave the retarder in order to arrive at its destination at a desired speed, said control means for at least one of the operating units near the entering end of the retarder being operated to actuate the associated section to a nonbraking position prior to a car entering the retarder if the car speed is above said exit speed but below a predetermined speed, and said control means for at least one of the other operating units being operated to a nonbraking position upon the passage of a car through the retarder only after the car has been within the retarder for a predetermined time interval determined by said computing means.

References Cited by the Examiner
UNITED STATES PATENTS

| | | | |
|---|---|---|---|
| 2,045,201 | 6/36 | Rabourdin | 246—182 |
| 2,080,053 | 5/37 | Livingston | 246—182 |
| 2,630,884 | 3/53 | Bone | 188—62 |
| 2,751,492 | 6/56 | Fitzsimmons | 246—182 |
| 2,801,711 | 8/57 | Field | 188—62 |

EUGENE G. BOTZ, *Primary Examiner*.

LEO QUACKENBUSH, *Examiner*.